United States Patent
Waddell et al.

(10) Patent No.: US 12,206,080 B2
(45) Date of Patent: Jan. 21, 2025

(54) MODULAR ENERGY STORAGE SYSTEM WITH BATTERY COOLING

(71) Applicant: GENERAL ELECTRIC COMPANY, Schenectady, NY (US)

(72) Inventors: Alistair Martin Waddell, Munich (DE); Richard Hayes Cutright, Schenectady, NY (US); Ralph Teichmann, Niskayuna, NY (US); Todd Garrett Wetzel, Malta, NY (US)

(73) Assignee: GE Grid Solutions LLC, Atlanta, GA (US)

( * ) Notice: Subject to any disclaimer, the term of this patent is extended or adjusted under 35 U.S.C. 154(b) by 0 days.

(21) Appl. No.: 16/615,885

(22) PCT Filed: May 30, 2018

(86) PCT No.: PCT/US2018/035051
§ 371 (c)(1),
(2) Date: Nov. 22, 2019

(87) PCT Pub. No.: WO2018/222663
PCT Pub. Date: Dec. 6, 2018

(65) Prior Publication Data
US 2020/0127347 A1     Apr. 23, 2020

Related U.S. Application Data

(60) Provisional application No. 62/512,239, filed on May 30, 2017.

(51) Int. Cl.
*H01M 10/60* (2014.01)
*H01M 10/617* (2014.01)
(Continued)

(52) U.S. Cl.
CPC ..... *H01M 10/6552* (2015.04); *H01M 10/617* (2015.04); *H01M 10/657* (2015.04); *H01M 50/204* (2021.01); *H01M 50/242* (2021.01)

(58) Field of Classification Search
CPC ......... H01M 10/6552; H01M 10/6551; H01M 10/6561; H01M 10/6567; H01M 10/617;
(Continued)

(56) References Cited

U.S. PATENT DOCUMENTS 4,189,527 A    2/1980 Rogers et al.
7,297,438 B2   11/2007 Kimoto
(Continued)

FOREIGN PATENT DOCUMENTS

CN    204441417 U    7/2015
EP    2565977 A1     3/2013

OTHER PUBLICATIONS

Murashko et. al.: "Optimization of the passive thermal control system of a lithium-ion battery with heat pipes embedded in an aluminum plate", Power Electronics and Applications (EPE), 2013 15th European Conference, 2013; pp. 1-10 Conference Location: Lille.

(Continued)

*Primary Examiner* — Raymond Alejandro
(74) *Attorney, Agent, or Firm* — Armstrong Teasdale LLP (57) ABSTRACT

A modular energy storage system including an enclosure having at least one thermally conductive sidewall; a battery module housed inside of the enclosure and including a plurality of battery submodules, each battery submodule including a plurality of battery cells, at least some of the plurality of battery cells being electrically interconnected to each other; at least one heat pipe thermally coupled to the plurality of battery cells of at least one of the plurality of battery submodules to channel heat from the plurality of (Continued)

battery cells thermally coupled thereto to the at least one thermally conductive sidewall of the enclosure; and a cooling mechanism thermally coupled to the at least one thermally conductive sidewall of the enclosure to cool the at least one heat pipe.

20 Claims, 13 Drawing Sheets

(51) Int. Cl.
  *H01M 10/6552* (2014.01)
  *H01M 10/657* (2014.01)
  *H01M 50/204* (2021.01)
  *H01M 50/242* (2021.01)

(58) Field of Classification Search
  CPC .. H01M 10/613; H01M 10/657; H01M 50/20; H01M 50/202; H01M 50/204
  See application file for complete search history.

(56) References Cited

U.S. PATENT DOCUMENTS

| | | |
|---|---|---|
| 8,231,996 B2 | 7/2012 | Howard et al. |
| 8,785,024 B2 | 7/2014 | Han et al. |
| 2011/0033742 A1 | 2/2011 | Maier et al. |
| 2011/0059346 A1 | 3/2011 | Jeong et al. |
| 2013/0071705 A1* | 3/2013 | Frutschy ........... H01M 10/6554 429/62 |
| 2013/0244066 A1* | 9/2013 | Kang ................. H01M 10/6552 429/62 |
| 2014/0165597 A1 | 6/2014 | Hernon et al. |
| 2014/0287291 A1* | 9/2014 | Miyawaki ........... H01M 10/613 429/120 |
| 2015/0155534 A1 | 6/2015 | Tsutsui et al. |
| 2015/0244036 A1 | 8/2015 | Lane et al. |
| 2015/0280184 A1 | 10/2015 | Utley et al. |

OTHER PUBLICATIONS

International Search and Written Opinion dated Nov. 9, 2018 which was issued in connection with PCT/US18/035051 which was filed on May 30, 2018.

* cited by examiner

MODULAR ENERGY STORAGE SYSTEM WITH BATTERY COOLING

BACKGROUND

The present disclosure relates, generally, to an energy storage system and, more specifically, to providing battery cooling in the energy storage system.

The worldwide demand for electrical energy has typically been increasing year after year. Most of the electrical energy demand is met by energy produced from conventional fossil fuel energy sources such as coal and gas. However, in recent years, along with some concerns regarding global climate change issues, there has been a push for electricity generation by renewable energy resources such as solar power and wind power.

Wind turbine generators are regarded as environmentally friendly and relatively inexpensive alternative sources of energy that utilize wind energy to produce electrical power. Further, solar power generation uses photovoltaic (PV) modules to generate electricity from the sunlight. However, since the intensity of wind and sunlight is not constant, consistent, and/or available in some locations and/or periods of time, the power output of wind turbines and PV modules may fluctuate over a period of time (e.g., day, weeks, etc.). Unfortunately, the electricity demand does not typically vary in accordance with solar and wind variations.

Therefore, a system and a method that will address the foregoing issues is desirable that can efficiently store energy from a variety of sources and provide a source of reliable energy.

DESCRIPTION OF THE DRAWINGS

These and other features and aspects of embodiments of the present disclosure will become better understood when the following detailed description is read with reference to the accompanying drawings, in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

An energy storage system may help to address the issue of variability of solar and wind power at a small scale. Essentially, the variable power from solar and wind power plants can be stored in the energy storage system which can then be used at a later time or at a remote location. Energy storage systems may also be charged from a power network and could be used to address the frequency variations, harmonic suppression, voltage support and power quality in the power network.

One challenge in an energy storage system may be that of battery cooling. The batteries generally include a plurality of battery cells and maintaining a set temperature (e.g., 25 degrees Celsius) uniformly across the plurality (e.g., thousands) of battery cells may be difficult to achieve. This problem may be further compounded by fluctuating loads that result in generating varying amounts of heat.

Figure 1:
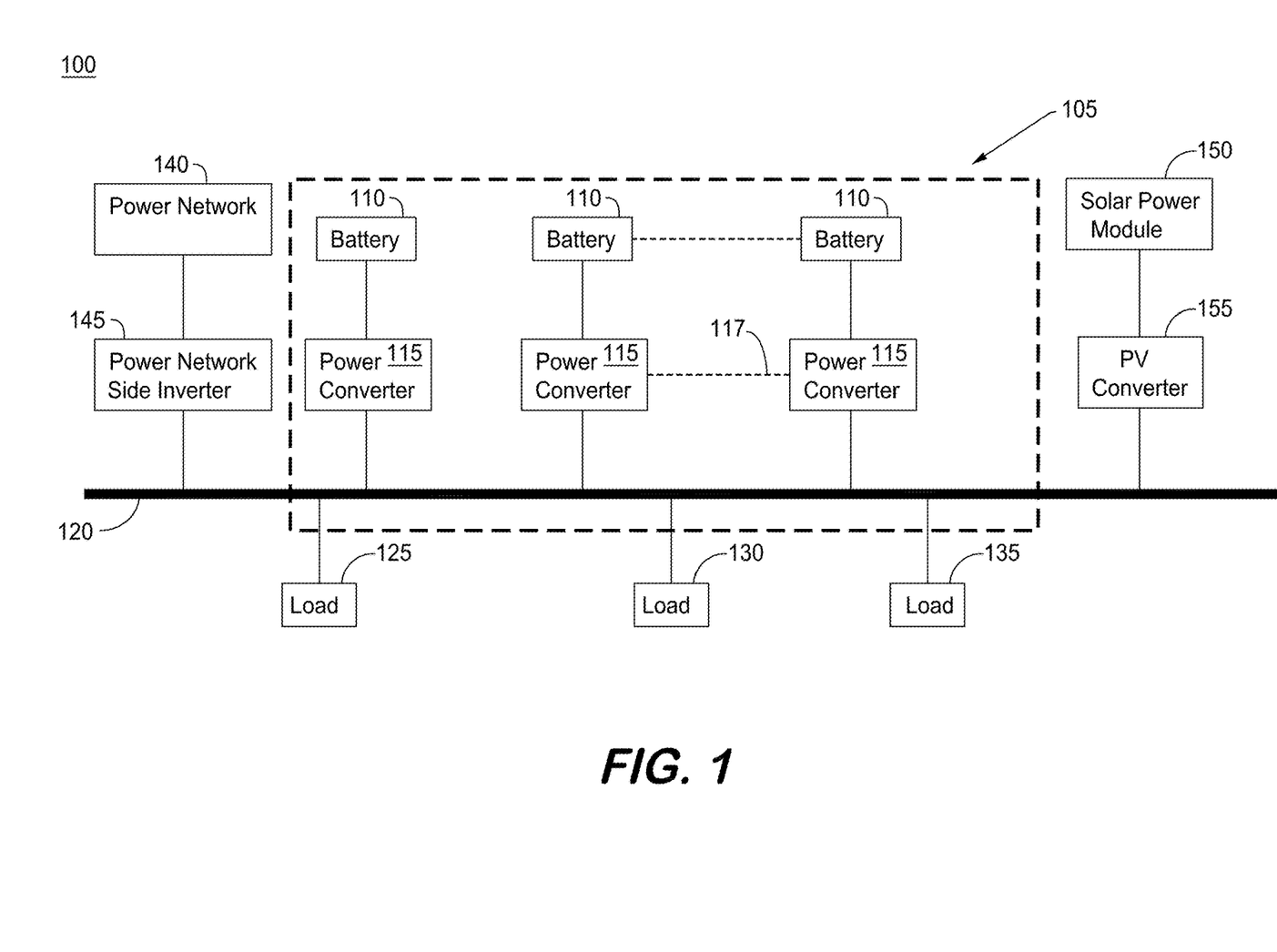
FIG. 1 is an illustrative schematic diagram example representing an energy storage system.

FIG. 1 is an illustrative depiction of a system, platform, or environment 100 including an energy storage system 105, according to some aspects of the present disclosure. Energy storage system 105 includes a plurality of battery modules 110 that are each electrically connected to an electrical bus 102 via a plurality of power converters 115. In the example of FIG. 1, electrical bus 120 is a direct current (DC) bus based on the configuration and operating characteristics of power converters 115. In some embodiments, each battery module includes a plurality of battery cells connected to each other. In some embodiments, the battery cells may be interconnected in series or parallel. Power converters 115 might operate to provide energy from battery modules 105 to loads 125, 130, and 135 connected to bus 120. In some embodiments, power converters 115 may operate to charge battery modules 105 with energy received from a power network 140 (e.g., a utility) and/or a renewable energy source such as solar power module 150. In some embodiments, power converters 115 may operate to facilitate a transfer of energy from one battery 110 to another battery 110 (as indicated by connection 117) or from one or more of the battery modules 110 to a power network 140.

In one embodiment, energy storage system 105 may be connected to power network 140 via a power network side inverter 145. Power network 140 might be a consumer, commercial, and/or utility scale power network. In another embodiment, energy storage system 105 may be connected to a renewable power source such as solar power module 150 that, in one embodiment, might include photovoltaic (PV) panels for generating solar power. Solar power module 150 is connected to the energy storage system 105 via a renewable converter 155. In an embodiment where the renewable power module includes PV panels, renewable converter 155 may be a photovoltaic (PV) converter.

In the example of FIG. 1, energy may be provided to loads 125 (e.g., a car charger), 130 (e.g., an electric drive), and 135 (e.g., a lighting system) connected to bus 120 from the plurality of battery modules 105. Depending on the operating properties of the loads 125, 130, and 135, a DC to AC (alternating current) converter may be needed between the loads and bus 120 where the load needs AC and bus 120 supplies DC. Likewise in some other scenarios, an AC to DC converter may be needed between the loads and the bus where the load needs DC and the bus supplies AC.

By controlling the DC bus voltage in some embodiments, batteries 105 may be charged from power network 140 and renewable power module 150. In some other embodiments, solar power module 150 (or any other renewable generation source such as, for example, a wind turbine) may be coupled to the DC bus 120 via a PV (or other renewable energy source) power converter 155 to charge battery modules 105. Moreover, in some embodiments, battery modules 105 may supply power to power network 140.

Energy storage system 105 may also include other components (not shown in FIG. 1) such as one or more controllers, communication modules, protection modules, and other systems, subs-systems, and components.

Figure 2:
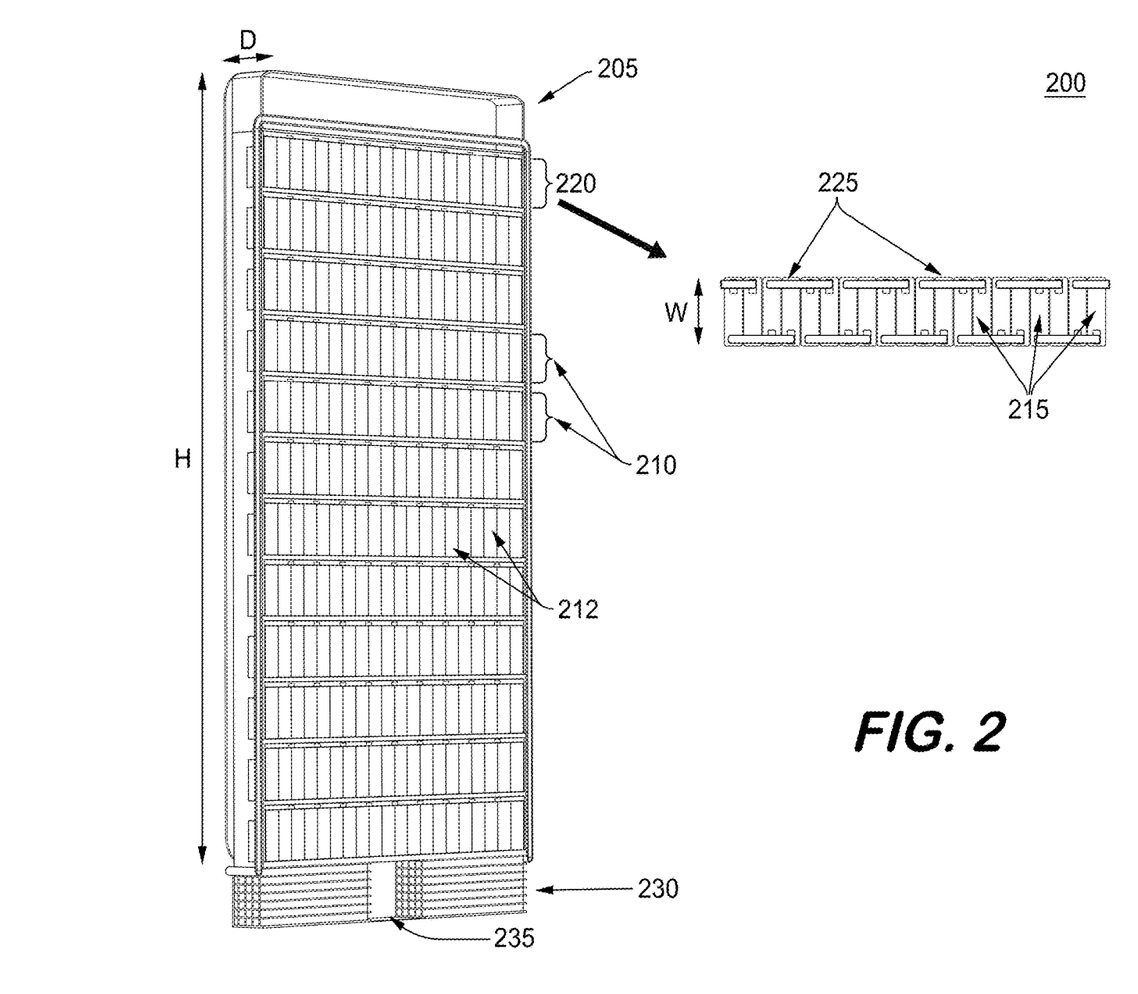
FIG. 2 is an illustrative schematic diagram of an example battery module of an energy storage system, in accordance with an embodiment of the present disclosure.

FIG. 2 is an illustrative depiction of a modular battery system 200, according to some embodiments. Modular battery system 200 may, in some aspects, correspond to energy storage system 105 according to some aspects of the present disclosure. Modular battery system 200 may represent one or more battery modules 105 of FIG. 1. In one embodiment, a plurality of modular battery systems 200 may be coupled together electrically, as well as physically in some embodiments, to form each battery module 105 of FIG. 1. In general, modular battery system 200 may be contained within a housing or enclosure 205. Enclosure 205 may further include power electronics and/or cooling equipment (not shown in FIG. 2) to manage, respectively, an electrical operation and thermal management of modular battery system 200.

Modular battery system 200 includes a plurality of battery submodules 210, each including a plurality of battery cells 212 connected in series, parallel, or combinations thereof. In the illustrated example of FIG. 2, battery submodules 210 are stacked vertically such that a height dimension (H) of modular battery system 200 is significantly greater than its depth dimension (D). One battery submodule 220 of modular battery system 200 is shown in greater detail to illustrate a plurality of connectors 225 that interconnect battery cells 215 comprising the battery submodule in a series and/or parallel configuration.

In FIG. 2, modular battery system 200 includes a single battery submodule (e.g., 210, 220) per row. However, in some embodiments a modular battery system herein may include two or more battery submodules per row, where each battery submodule may be separately controllable.

In some embodiments, modular battery system 200 includes an energy absorption zone 230 positioned under the plurality of battery submodules (e.g., 210, 220) included in the modular battery system. Energy absorption zone 230 may provide a level of structural reinforcement and further act to absorb at least some mechanical energy that may be caused by an impact force to modular battery system 200. For example, energy absorption zone 230 may include a crumple zone configured to provide a controlled deformation upon impact of modular battery system 200 with the ground, a mounting surface, or any other object. Alternatively, an elastomeric compound or other energy absorbing materials may be used in or around absorption zone 230. In one embodiment, energy absorption zone 230 includes one or more coupling regions 235 configured to allow a lifting element such as a forklift blade, moving strap, or other mechanical devices to be inserted therein to facilitate a placement or relocation of modular battery system 200. In one embodiment, coupling region 235 includes a void, opening, or cavity within absorption zone 230 that is sufficiently sized to accommodate a forklift blade being inserted therein or therethrough.

Figure 3:
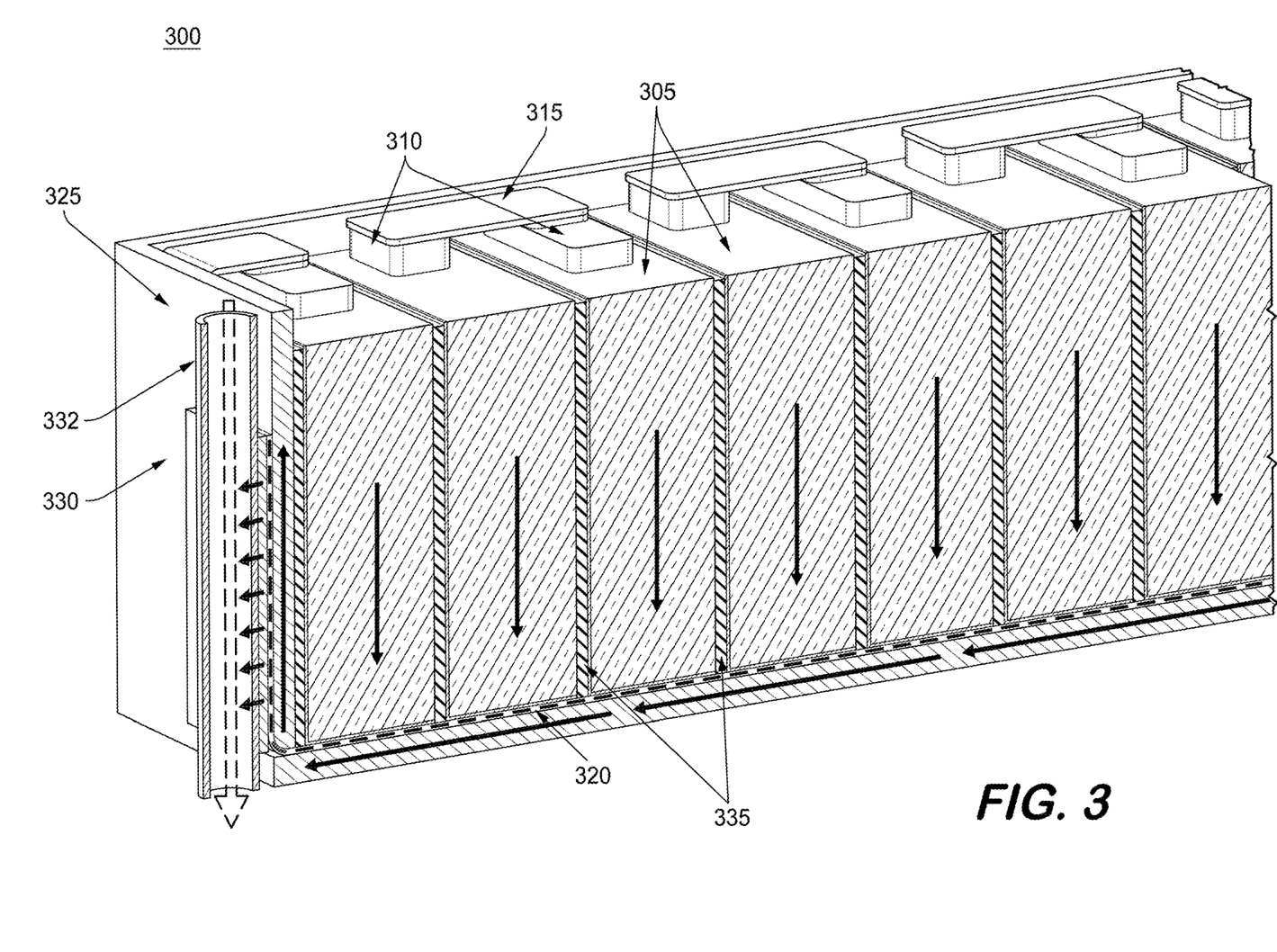
FIG. 3 is an illustrative schematic diagram of an example battery submodule of an energy storage system, in accordance with an embodiment of the present disclosure.

FIG. 3 is an illustrative example of a battery submodule 300 of a modular battery system of the present disclosure. Battery submodule 300 may correspond to a detailed view of battery submodule 210 of FIG. 2. Battery submodule 300 includes a plurality of battery cells 305 that may be connected to each other in series, parallel, or combinations thereof. Each battery cell 305 includes a battery cell terminal 310. As shown in FIG. 3, battery cell terminals 310 are connected to each other (e.g., in series, parallel, or combinations thereof) by electrical conductors 315 to provide electrical connections therebetween.

In some aspects, battery submodules herein generate heat when in operation. In some embodiments, it may be desirable to keep the battery cells and battery submodules disclosed herein as isothermal as possible, even when the battery cells and battery submodules might be experiencing transient load conditions that might generate spikes (i.e., increases) in thermal energy produced by the battery cells and battery submodules. Operating battery cells and battery submodules under high or increased temperatures, even for short periods of times (i.e., transients) may result in degradation of the battery cells and battery submodules and/or thermal runaway failures thereof. In some embodiments, modular battery systems herein may include thermal management mechanisms to transfer or otherwise channel heat from battery cells in a battery submodule to an area away therefrom, such as an exterior of a container or enclosure housing the battery submodule where the transferred heat might be further managed by a bulk heat cooling mechanism such as, for example, an air and/or liquid cooling system.

Referring again to FIG. 3, a heat pipe 320 is shown coupled to the plurality of battery cells 305 along a bottom peripheral edge of the battery cells to transport heat from the plurality of battery cells to a side wall 325 of the enclosure of battery submodule 300. A cooling mechanism 330 is thermally coupled to side wall 325 to continually cool heat pipe 320, and by extension, the battery cells 305 thermally connected to heat pipe 320. In one embodiment, each battery submodule 300 includes a corresponding heat pipe 320. In some embodiments, each battery submodule (e.g., battery submodule 300) may further include a separate cooling mechanism 330, whereas in some other embodiments multiple or all battery submodules 300 in a modular battery system might share a single cooling mechanism.

In some embodiments, the cooling mechanism (e.g., 320) may include, at least in part, an air cooling or liquid cooling mechanism, system, or device. In a further embodiment, the cooling mechanism may include a thermoelectric cooling mechanism (example embodiments will be described in greater detail hereinbelow). In the illustrated embodiment of FIG. 3, a liquid cooling mechanism 330 is shown that includes a conduit 332 through which a cooling fluid (i.e., coolant) is circulated along multiple battery modules. Cooling mechanism 330 is thermally connected to heat pipe 320, via a thermal connection to enclosure wall 325, to transfer heat from the heat pipe.

In some aspects, battery cells 305 may be thermally separated from each other by a thermal isolating barrier 335. In various embodiments, the thermal isolating barrier may be an open or closed polystyrene or other foam, a dielectric liquid, and other materials alone or in combination. In some aspects, maintaining a thermal separation between cells in a battery submodule and between submodules may contribute to limiting potential thermal runaway scenarios. In some embodiments, battery submodules may be connected (e.g., in series) to establish high potential voltages and the battery modules may be thermally and electrically isolated from each other except for their electrical terminal connections by thermal isolating barrier 335.

Figure 4:
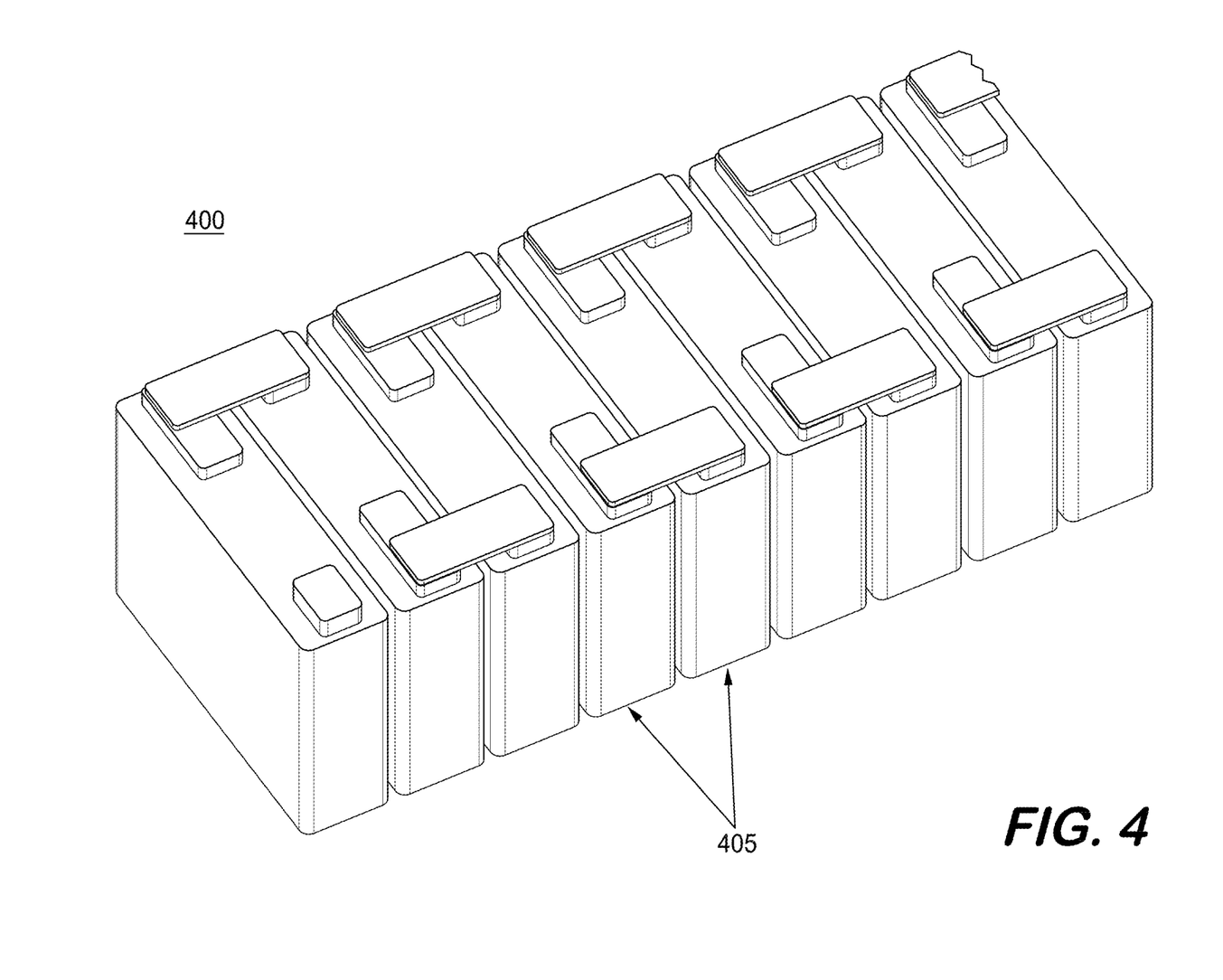
FIG. 4 is an illustrative schematic diagram of an example battery submodule, in accordance with another embodiment of the present disclosure.

FIG. 4 is an illustrative depiction of a plurality of battery cells 405 comprising a battery submodule 400, in accordance with some embodiments herein. Battery cells 405 are similar to the battery cells of FIG. 3, except battery cells 405 include a different electrode configuration and are electrically connected in series.

Figure 5:
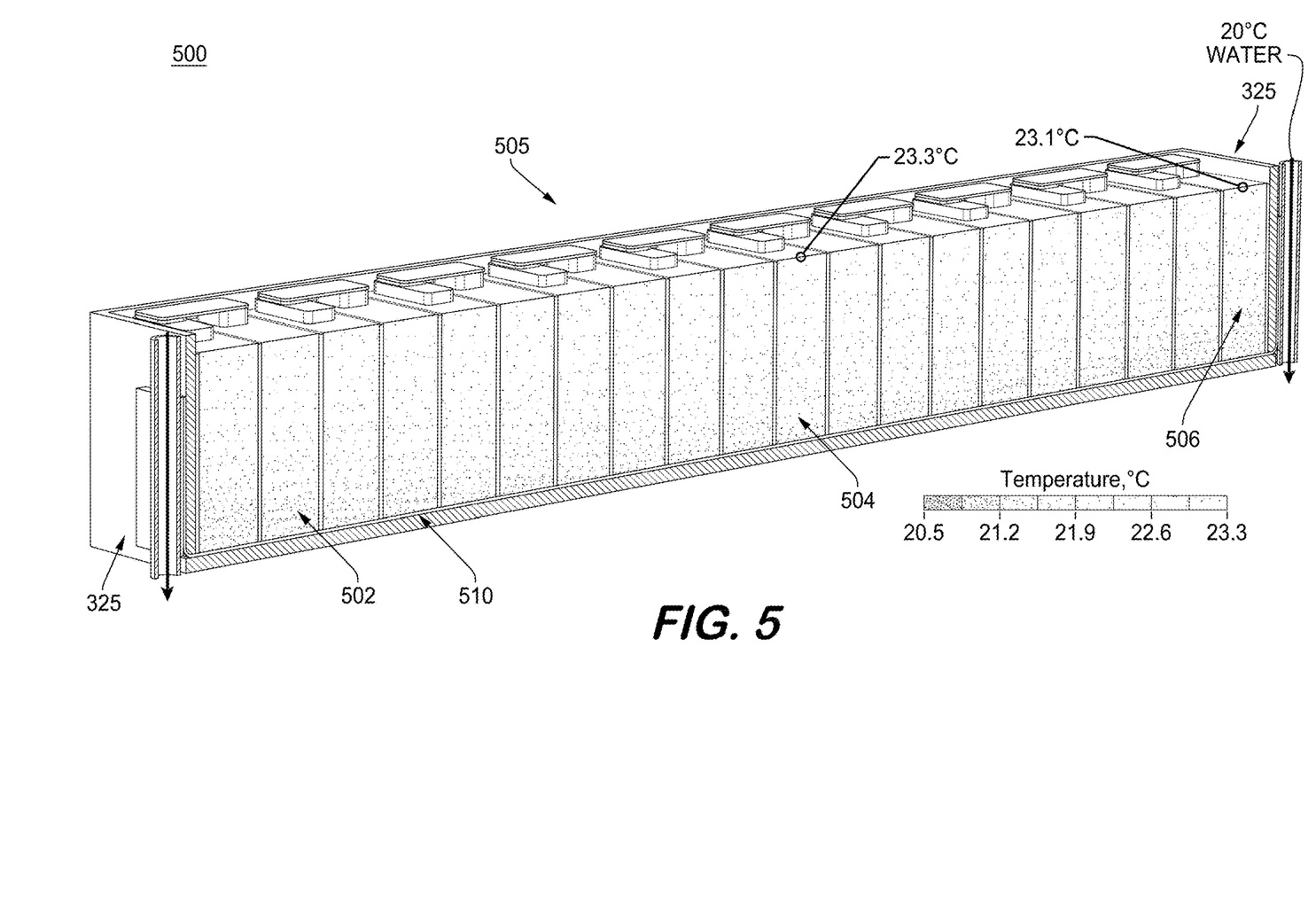
FIG. 5 is an illustrative schematic diagram depicting a temperature variation in a battery submodule, in accordance with an embodiment of the present disclosure.

FIG. 5 is an illustrative depiction of a temperature variation diagram 500 for a liquid cooled embodiment of a battery submodule 505 having a high thermal conductivity heat pipe 510 disposed in contact with the plurality of battery cells (e.g., 502, 504) comprising the battery submodule. As shown in FIG. 5, at an area near the top portion of one battery cell 504 (i.e., near to the terminals of the battery cell and furthest from heat pipe 510) the temperature is about 23.3 degrees Celsius, whereas near the top of another battery cell 506 the temperature in a top portion thereof is about 23.1 degrees Celsius. In some aspects, heat pipe 510, as configured and connected across all of the battery cells in battery submodule 500, acts as a thermal ground plane and enables greater uniformity in cell temperature across the battery submodule 505. Therefore, in some embodiments disclosed herein, a heat pipe operates to maintain a temperature difference between battery cells of a battery submodule within a small temperature range. In one embodiment, the temperature range may be 0.2 degrees Celsius. In some aspects, FIG. 5 demonstrates the relatively high temperature uniformity that can be achieved and maintained between battery cells in a battery submodule configured to have a heat pipe with a high thermal conductivity, as disclosed herein.

Figure 6:
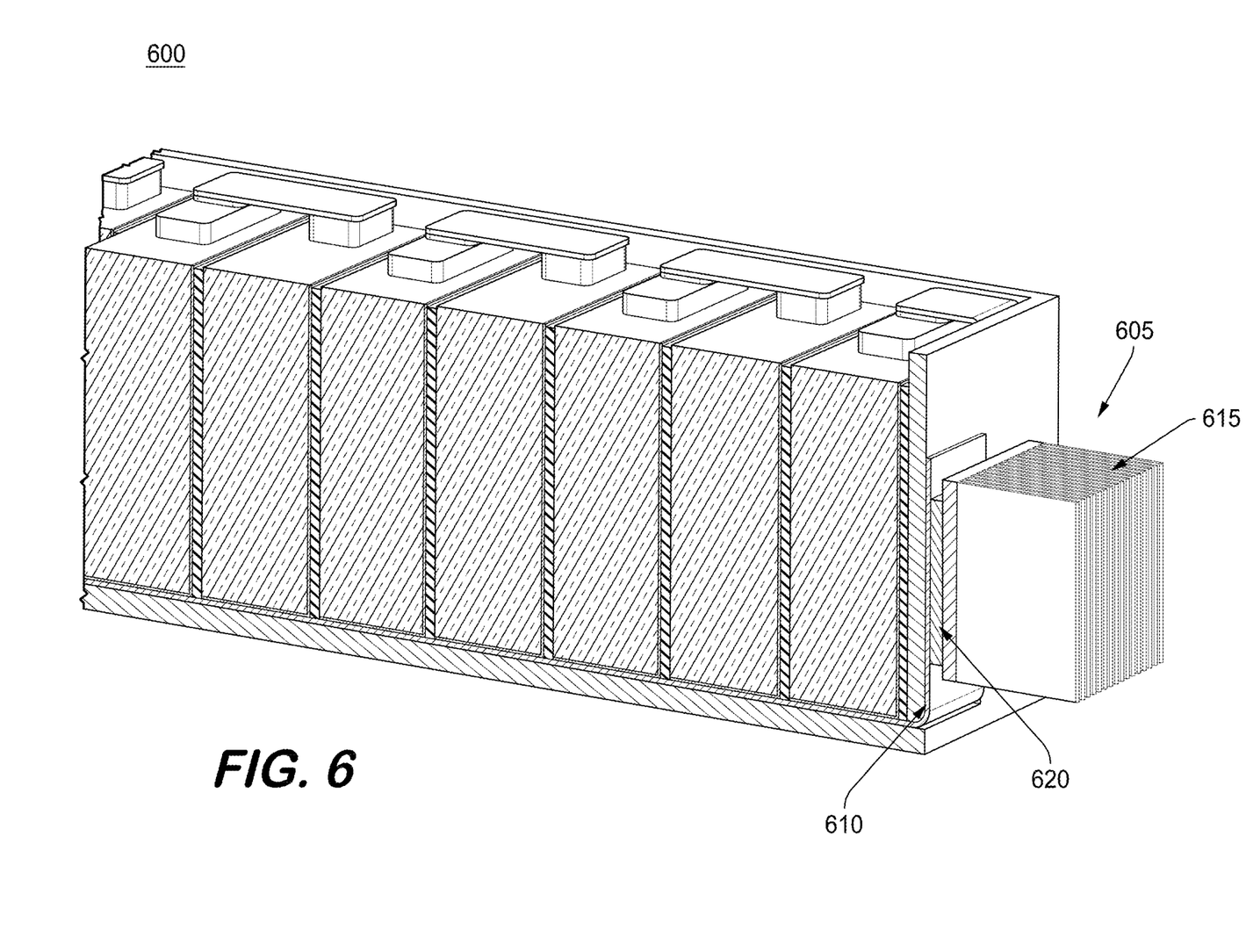
FIG. 6 is an illustrative schematic diagram of a battery submodule including a heat sink, in accordance with an embodiment of the present disclosure.

FIG. 6 is an illustrative diagram of a battery submodule 600, in accordance with yet another embodiment of the present disclosure. Battery submodule 600 includes a heat sink cooling mechanism 605 to transfer heat from heat pipe 610. Heat sink cooling mechanism 605 includes a heat sink 615 coupled to heat pipe 610 via a thermoelectric cooler (TEC) layer 620. In some aspects, the inclusion and use of TEC layer 620 enables a fully passive cooling system with no moving parts. In some embodiments, other passive and active cooling mechanisms may be used in conjunction with a battery submodule disclosed herein.

Figure 7:
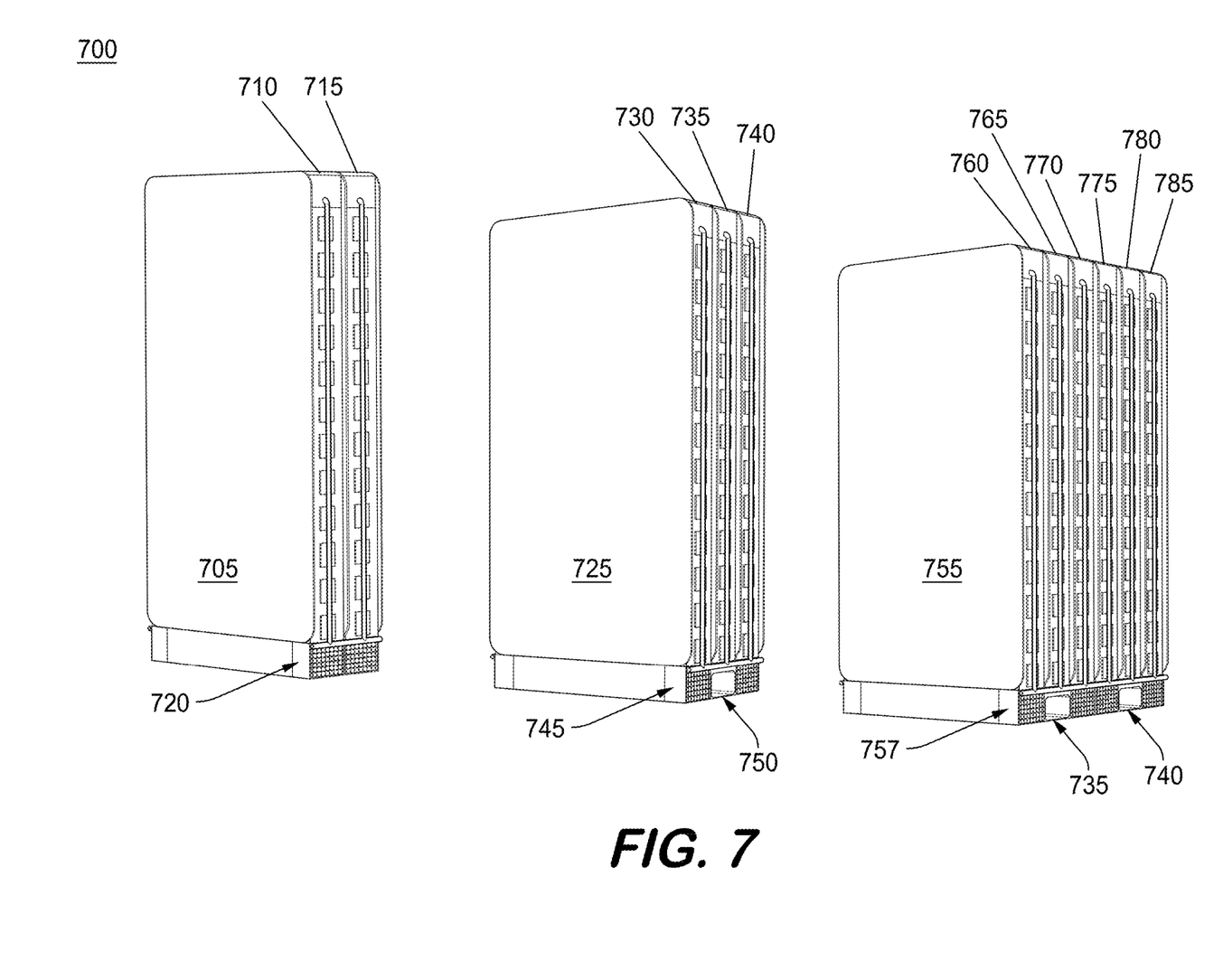
FIG. 7 is an illustrative depiction of a variety of battery modules, in accordance with embodiment of the present disclosure.

FIG. 7 is an illustrative depiction of a plurality of battery modules, in accordance with an embodiment of the present disclosure. The battery module configurations of FIG. 7 demonstrate some of the modular design aspects of the modular battery system disclosed herein. In embodiment 705, two battery modules 710 and 715 are coupled to each other and may measure about 0.4 meters in width, whereas in embodiment 725 three battery modules (730, 735, and 740) are coupled to each other and may measure about 0.6 meters in width. Moreover, in embodiment 755 six battery modules (760, 765, 770, 775, 780, and 785) are coupled to each other and may measure about 1.2 meters in width. In some contexts and use-cases, embodiment 705 may be used in a residential energy storage system, whereas embodiments 725 and 755 may be used for industrial or utility level energy storage system(s). FIG. 7 also illustrates modular battery systems herein having energy absorption zones (720, 745, and 757) and coupling regions (750, 735, and 740).

Figure 8:
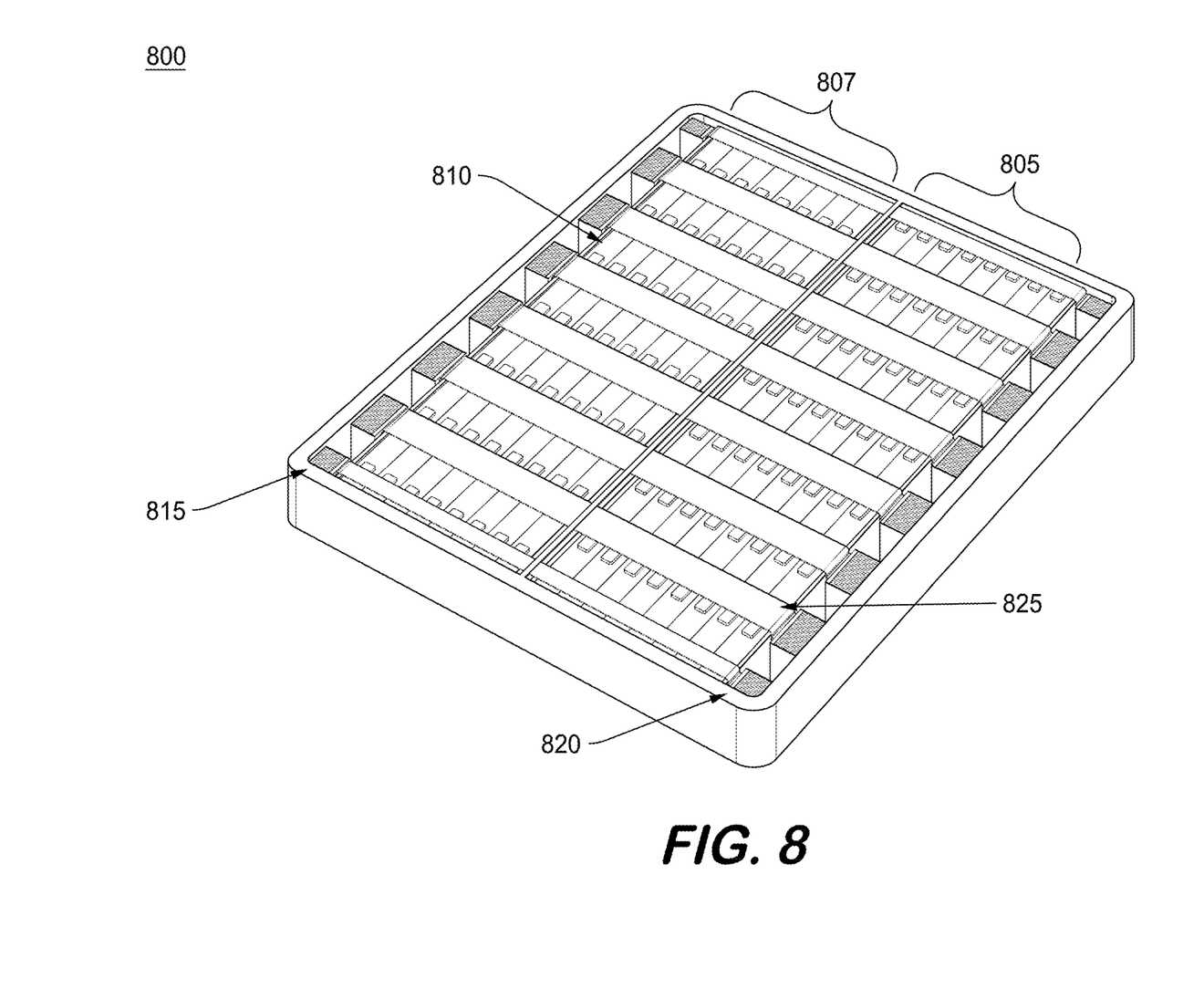
FIG. 8 is an illustrative schematic diagram of yet another battery module, in accordance with an embodiment of the present disclosure.

FIG. 8 is an illustrative depiction of a battery module 800, in accordance with some embodiments herein. Battery module 800 includes a plurality of battery submodules 805 and 807, each comprising a plurality of parallel coupled battery cells 810. Battery module 800 further includes cooling mechanisms 815, 820 and heat pipe integrated busbars 825. In some embodiments, cooling mechanisms 815 and 820, may include, for example, passive heatsinks for applications with low thermal generation/flux; heatsinks for forced flow from, for example, blower(s), micro-flow piezo-based devices, etc.; active cooling devices (e.g., Peltier thermoelectric heat pump); and combinations thereof. Battery module 800 may configured to be mounted in an equipment rack and may thus be referred to as a "rack-mount" configuration. Similar to other battery modules disclosed herein, heat pipe bus bars 825 operate to channel heat away from battery cells 810 to an exterior housing area where the transferred heat can be further managed by an external cooling system.

Figure 9:
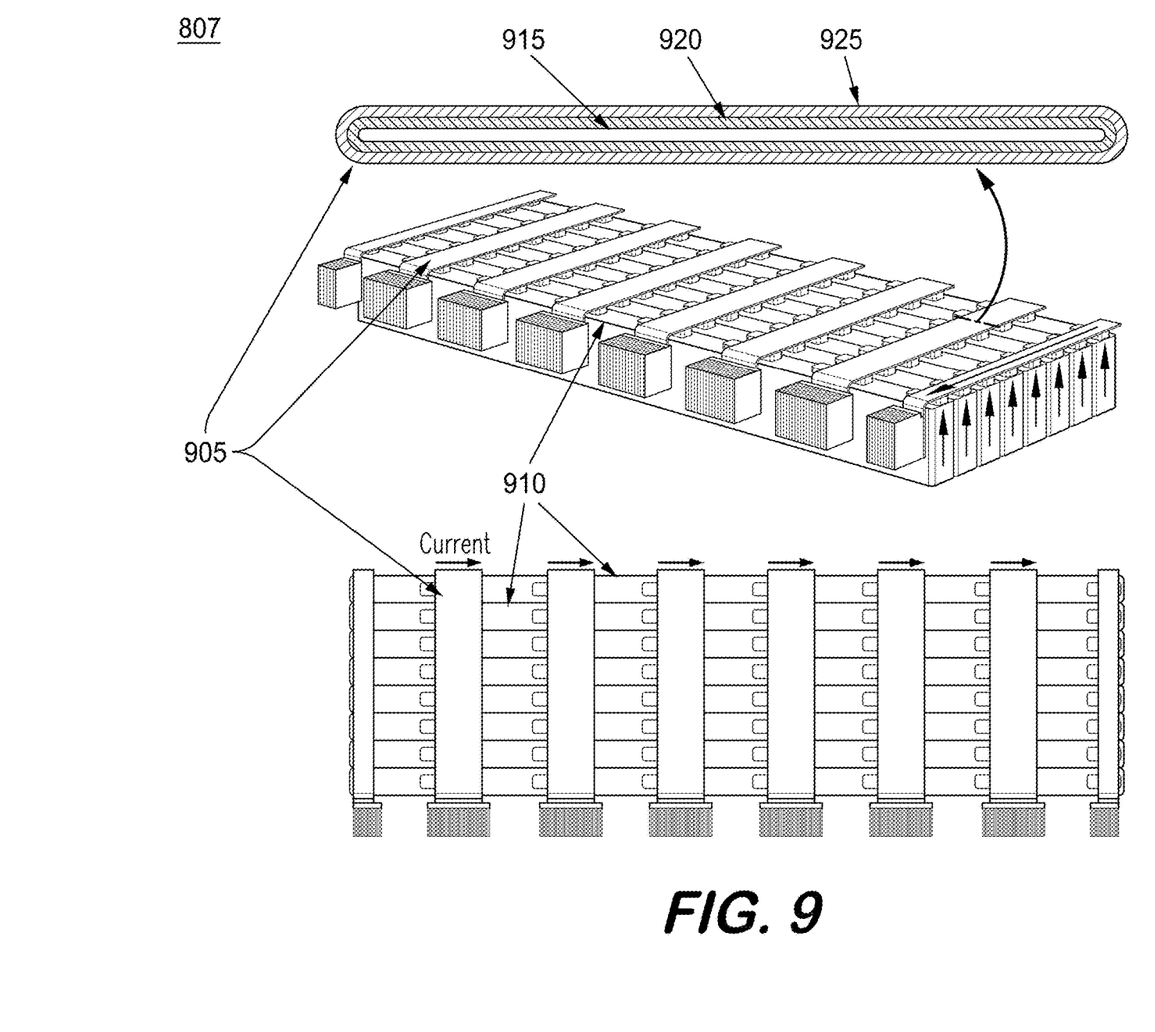
FIG. 9 is an illustrative schematic diagram, including a detailed view, of a battery submodule, in accordance with an embodiment of the present disclosure.

FIG. 9 is an illustrative diagram including a detailed view of some aspects of FIG. 8, in accordance with an embodiment of the present disclosure. Battery submodule 807 includes a heat pipe bus bar 905 that provides an electrical connection between battery cells 910 comprising the battery submodule. In general, heat pipe bus bars 905 include a vapor core 915, a wick 920, and a copper shell 925, as shown in the cross-section view of the heat pipe bus bar in FIG. 9. In some aspects, the heat pipe bus bar is constructed of a material having high thermal and electrical conductivity such as, for example, copper. As such, heat pipe bus bar 905 may serve dual functions of being a conduit to carry electricity from one battery cell to another and carry heat from battery cells 910 to an end of the battery submodule 807 where it interfaces with a cooling mechanism (e.g., a liquid cooled cooling mechanism in thermal communication with the exterior walls of an enclosure containing battery submodule 807). The dual functionality of the heat pipe bus bars in FIG. 9 may reduce manufacturing complexity and costs, as well as providing a reduction is space requirements (i.e., two separate bus bars are not required for thermal energy heat transfer and electrical energy transfer).

In some aspects, heat pipe bus bars as disclosed in FIG. 9 may leverage the thermal conductivity through the battery cells via the terminals of the battery cells. The electrical terminals of the individual battery cells can conduct both electricity and heat, and the heat pipe bus bars of FIG. 9 leverage these characteristics/features for improved heat transfer from within a battery cell (as compared to a heat pipe connected solely to a peripheral end or portion of a battery cell).

Figure 10:
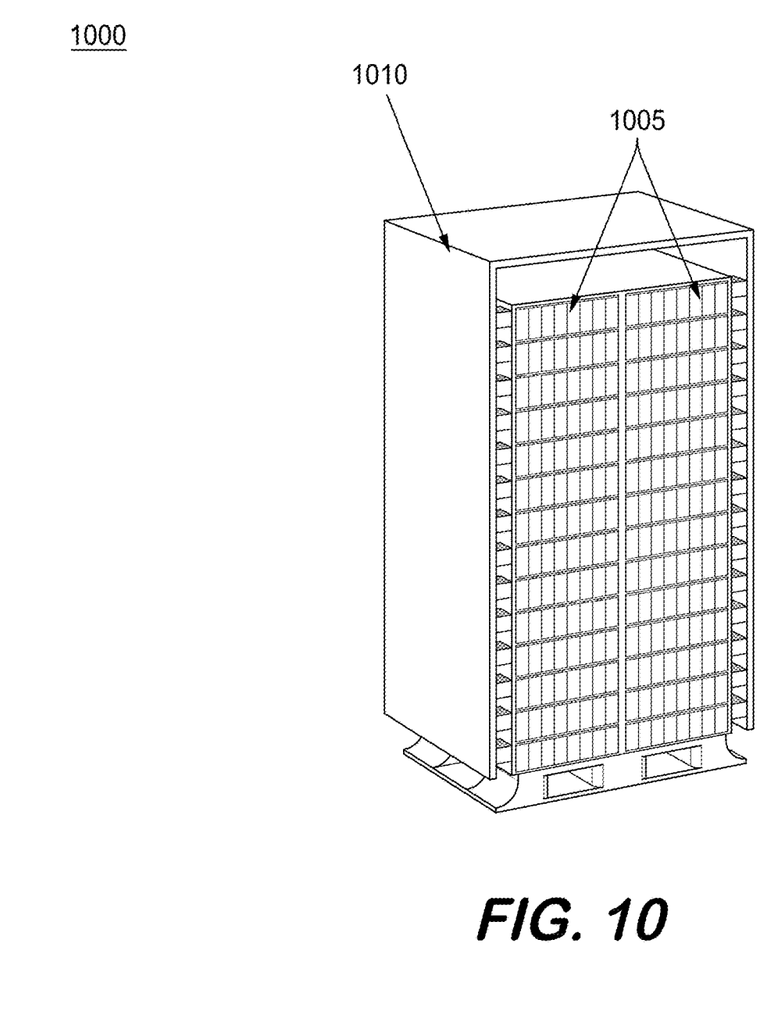
FIG. 10 is an illustrative depiction of a battery housing including a plurality of battery modules therein, in accordance with an embodiment of the present disclosure.

FIG. 10 is an illustrative depiction of a battery module 1000 having a plurality of battery submodules 1005 disposed in a housing or enclosure 1010, in accordance with one embodiment. In FIG. 10, battery submodules 1005 may be substantially similar to other battery submodules disclosed herein such as, for example, battery submodule 800. In general, battery module 1000 may comprise battery submodules that may be configured in the form of a tray/drawer and placed in enclosure 1010 of battery module 1000 by sliding or otherwise inserting the tray/drawer containing the battery submodules inside individual enclosure sections. In some aspects, battery module 1000 (and similar units) may be located outside of a building for improved ambient air flow over and around the unit. In some instances, one or two units may be deployed for small-scale applications (e.g., residential/homestead applications).

Figure 11:
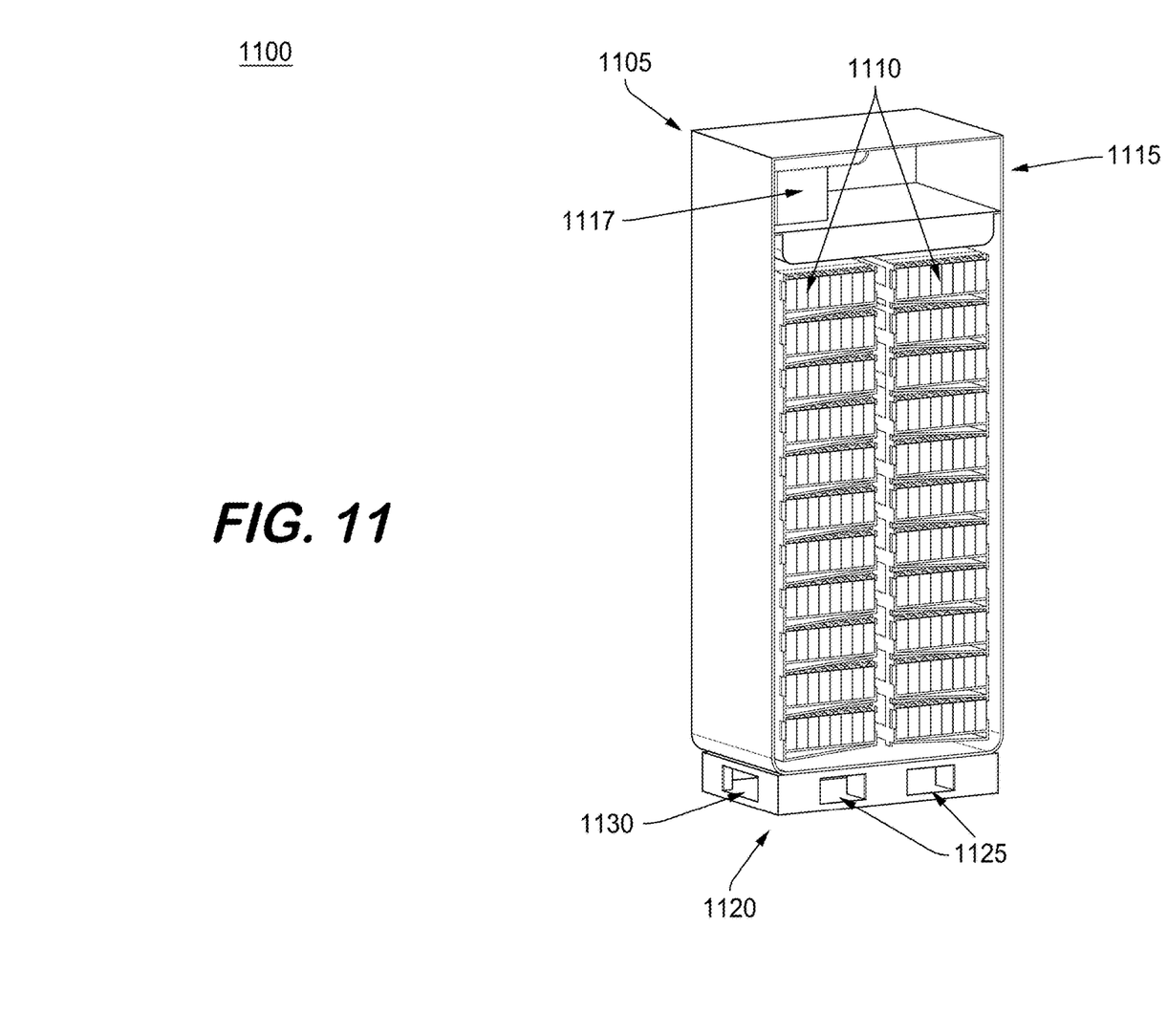
FIG. 11 is an illustrative depiction of a modular energy storage system including battery cooling, in accordance with an embodiment of the present disclosure.
Figure 12:
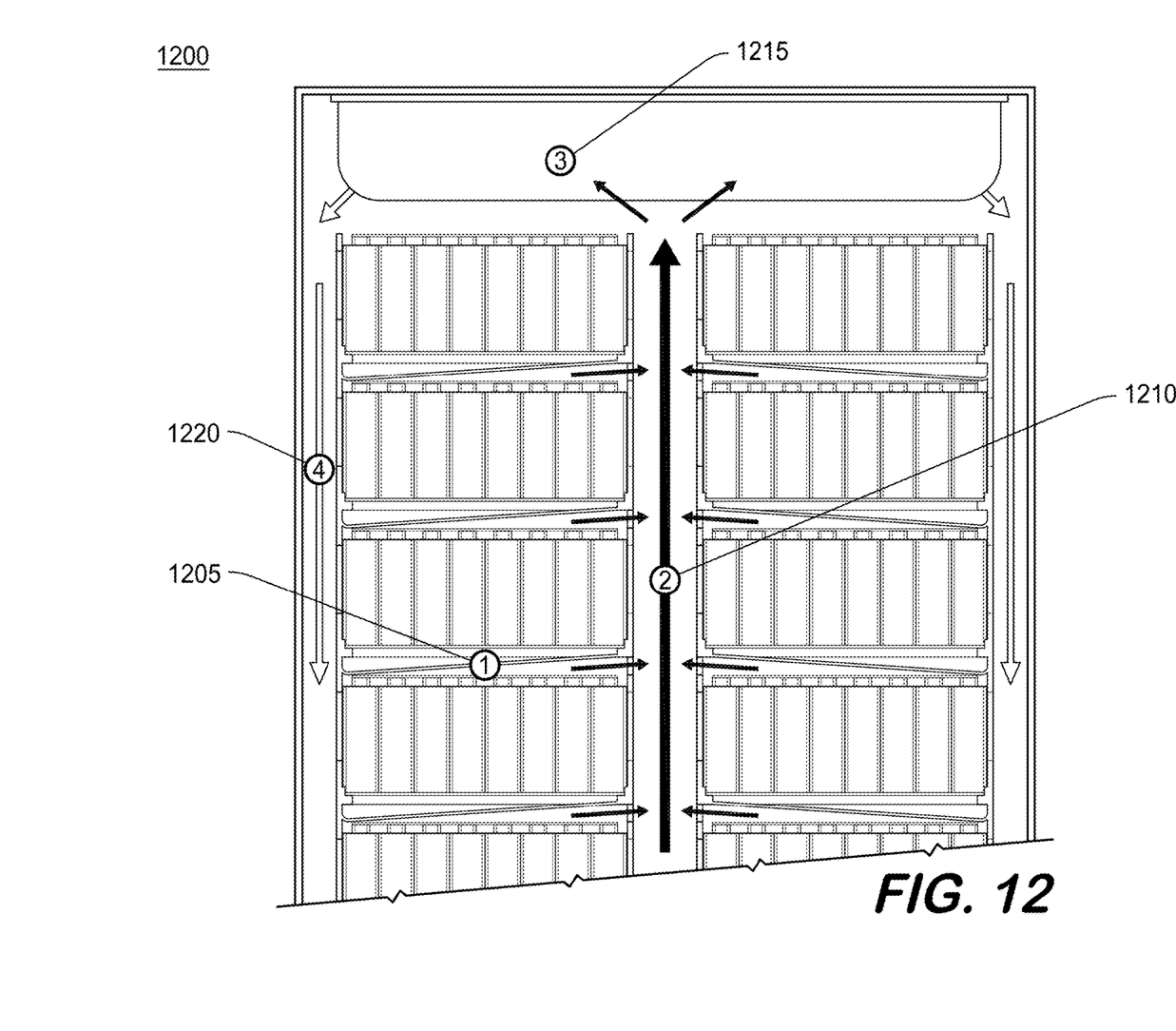
FIG. 12 is an illustrative depiction including a detailed view of a battery module and associated cooling mechanisms of FIG. 11, in accordance with an embodiment of the present disclosure.

FIGS. 11 and 12 may be referred to in tandem, where FIG. 12 illustrates some aspects in greater detail than FIG. 11. FIG. 11 includes a pictorial view of a battery module 1100, in accordance with an embodiment. Battery module 1100 includes an enclosure 1105 that houses a plurality of battery submodules 1110 in a liquid cooling configuration. Enclosure 1105 includes a section 1117 that may include power electronic and/or cooling equipment (not shown in FIG. 11). Battery 1100 further includes an energy absorption zone 1120, as well as coupling regions 1125 and 1130. In some aspects, battery submodules in battery module 1000 are each hermetically sealed within a phase change liquid, where the phase change liquid used is chosen, by calculated determinations, to changed phases near the operating point temperature of the battery cells such that the phase change liquid can efficiently and effectively transfer heat from the battery cells.

FIG. 12 shows a more detailed view of a battery 1200, in accordance with an embodiment. Referring to FIG. 12, at 1205 cooling fluid (e.g., a phase change liquid) boils when the temperature on the busbars around the battery cells reaches a threshold temperature due to the heat being produced by the battery cells. The vapor produced by the boiling of the liquid rises through the center aisle at 1210 and thermally conductive fins at 1215 condense the two-phase flow. At 1220, a single-phase return flow path is shown for the liquid, completing a natural circulation flow for the depicted configuration.

Figure 13:
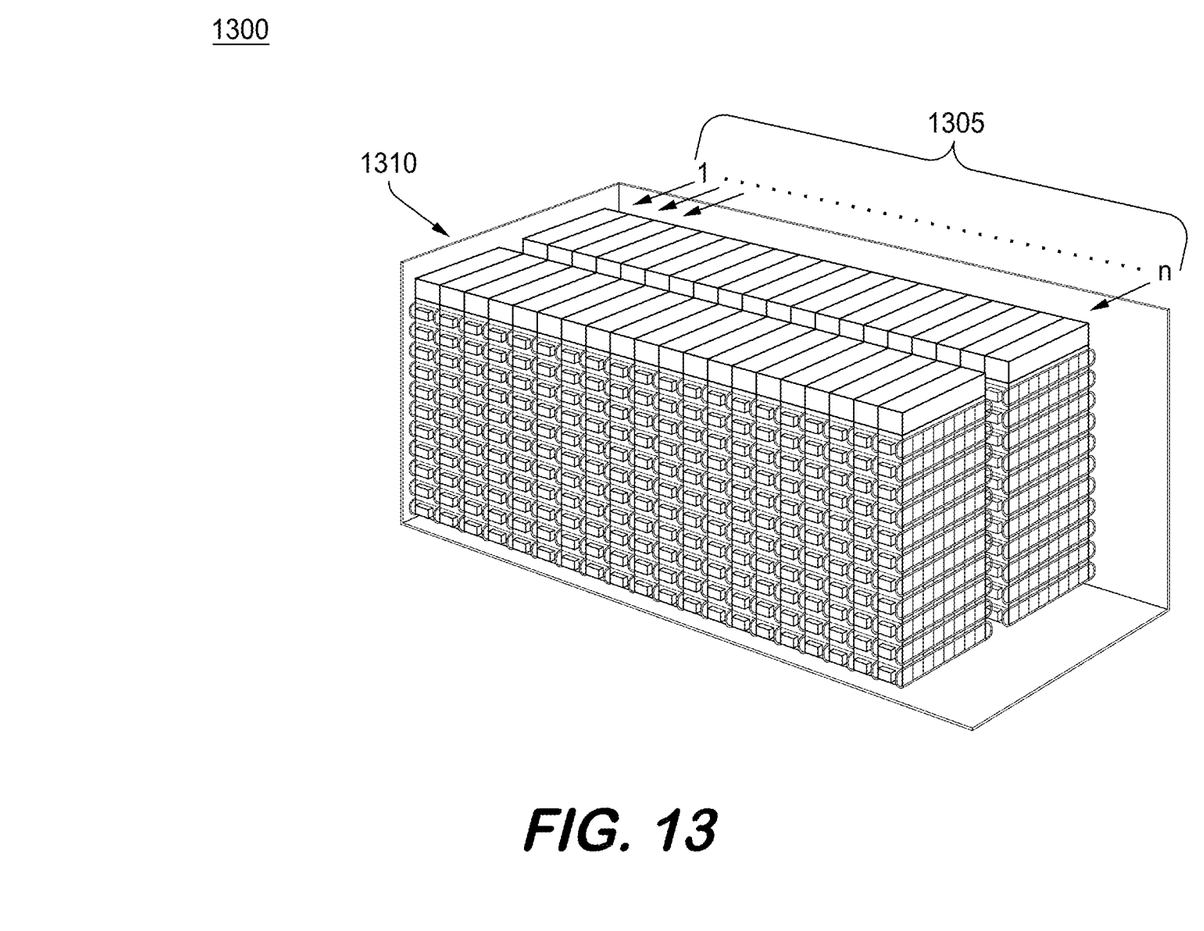
FIG. 13 is an illustrative depiction of an energy storage system including a plurality of modular energy storage systems, in accordance with an embodiment of the present disclosure.

FIG. 13 is an illustrative depiction of a modular battery system 1300, in accordance with some embodiments herein. Modular battery energy storage system 1300 includes a plurality of battery modules 1305 (i.e., 1–n units) within an enclosure 1310. Each of battery module 1305 includes a plurality of battery submodules as disclosed hereinabove. The number of battery modules deployed within enclosure 1310 can vary and can be advantageously scaled in accordance with a desired power rating for system 1300. In the illustrated embodiment of FIG. 13, enclosure 1310 may be a standard shipping container (ISO, International Organization for Standardization, standard or otherwise) that contains two rows or banks of battery modules 1305. In some aspects, the modular battery system of FIG. 13 may be serviced through access panels in enclosure 1310.

This written description uses examples to explain the disclosure, including the best mode, and also to enable any person skilled in the art to practice the disclosure, including making and using any devices or systems and performing any incorporated methods. The patentable scope of the disclosure is defined by the claims appended hereto, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A modular energy storage system, comprising:
 an enclosure having at least one thermally conductive sidewall;
 a battery module housed inside of the enclosure, the battery module including:
 a plurality of battery submodules, each battery submodule including a plurality of battery cells and a plurality of thermal isolating barriers positioned to thermally separate each of the plurality of battery cells, each of the plurality of battery cells defining a bottom peripheral edge and at least some of the plurality of battery cells being electrically interconnected to each other;
 at least one heat pipe thermally coupled to the bottom peripheral edge of each of the plurality of battery cells of at least one of the plurality of battery submodules to channel heat from the plurality of battery cells thermally coupled thereto to the at least one thermally conductive sidewall of the enclosure,
 wherein the at least one heat pipe is positioned and extends directly adjacent to the bottom peripheral edge of each of the plurality of battery cells of at least one of the plurality of battery submodules; and
 a cooling mechanism thermally coupled to the at least one thermally conductive sidewall of the enclosure to cool the at least one heat pipe.

2. The system of claim 1, wherein the enclosure includes at least one of an equipment rack, a storage container, and a shipping container.

3. The system of claim 1, wherein the enclosure includes an energy absorption zone to provide at least one of a level of structural reinforcement and mechanical force absorption to the enclosure.

4. The system of claim 1, wherein at least some of the plurality of battery cells of the plurality of battery submodules are electrically connected in series, parallel, and combinations thereof, the plurality of battery cells thermally coupled to the at least one thermally conductive sidewall of the enclosure.

5. The system of claim 1, wherein the at least one heat pipe operates as a thermal ground plane for the plurality of battery cells thermally coupled thereto.

6. The system of claim 1, wherein the at least one heat pipe thermally coupled to the plurality of battery cells maintains a level of temperature uniformity between the plurality of battery cells by channeling heat from the plurality of battery cells thermally coupled thereto to the at least one thermally conductive sidewall of the enclosure.

7. The system of claim 6, wherein the at least one heat pipe maintains a level of temperature uniformity between the plurality of battery cells thermally coupled thereto of about 0.2 degrees Celsius.

8. The system of claim 1, wherein the at least one heat pipe provides an electrical connection between the plurality of battery cells thermally coupled thereto.

9. The system of claim 1, wherein the enclosure houses a plurality of battery modules, each battery module including a plurality of battery submodules, wherein each battery submodule includes:
 a plurality of battery cells, each defining a bottom peripheral edge, the plurality of battery cells thermally coupled to the at least one thermally conductive sidewall of the enclosure; and
 the at least one heat pipe thermally coupled to and positioned directly adjacent the bottom peripheral edge of each of the plurality of battery cells that channels heat from the plurality of battery cells coupled thereto to the at least one thermally conductive sidewall of the enclosure.

10. The system of claim 1, wherein the cooling mechanism includes at least one heat sink thermally coupled to the at least one heat pipe through a thermoelectric cooler.

11. The system of claim 1, wherein the cooling mechanism constitutes a liquid or heatsink cooling mechanism thermally coupled to the at least one thermally conductive sidewall of the enclosure.

12. The system of claim 1, wherein each of the at least one heat pipes is thermally coupled to the plurality of battery cells of one of the plurality of battery submodules to channel heat from the plurality of battery cells thermally coupled thereto to the at least one thermally conductive sidewall of the enclosure.

13. The system of claim 1, wherein the energy absorption zone comprises a crumple zone configured to provide a controlled deformation upon impact therewith.

14. The system of claim 1, wherein the energy absorption zone further includes at least one of an elastomeric compound or other energy absorbing material disposed in or around the energy absorption zone.

15. The system of claim 1, wherein the energy absorption zone further comprises one or more coupling regions, the coupling regions being configured to receive a lifting element to facilitate a placement of modular energy storage system.

16. The system of claim 15, wherein the one or more coupling zones comprise an opening within the energy absorption zone to accommodate the lifting element.

17. A modular energy storage system, comprising:
an enclosure having at least one thermally conductive sidewall;
a battery module housed inside of the enclosure, the battery module including:
a plurality of battery submodules, each battery submodule including a plurality of battery cells, at least some of the plurality of battery cells being electrically interconnected to each other;
at least one heat pipe thermally coupled to the plurality of battery cells of at least one of the plurality of battery submodules to channel heat from the plurality of battery cells coupled thereto to the at least one thermally conductive sidewall of the enclosure,
wherein the at least one heat pipe directly contacts and extends directly adjacent a bottom peripheral edge of each of the plurality of battery cells of at least one of the plurality of battery submodules; and
a cooling mechanism thermally coupled to the at least one thermally conductive sidewall of the enclosure to cool the at least one heat pipe.

18. The system of claim 17, wherein the at least one heat pipe coupled to the plurality of battery cells maintains a level of temperature uniformity between the plurality of battery cells by channeling heat from the plurality of battery cells coupled thereto to the at least one thermally conductive sidewall of the enclosure.

19. The system of claim 18, wherein the at least one heat pipe maintains a level of temperature uniformity between the plurality of battery cells coupled thereto of about 0.2 degrees Celsius.

20. The system of claim 17, wherein the plurality of battery cells thermally coupled to the at least one thermally conductive sidewall of the enclosure are thermally separated from one another by a thermal isolating barrier.

* * * * *